(12) United States Patent
O'Connor et al.

(10) Patent No.: US 7,922,147 B2
(45) Date of Patent: Apr. 12, 2011

(54) DIAPHRAGM WITH SEGMENTED INSERT

(75) Inventors: J. Timothy O'Connor, Whispering Pines, NC (US); Michael A. Funari, Apex, NC (US)

(73) Assignee: Zurn Industries, LLC, Erie, PA (US)

( * ) Notice: Subject to any disclaimer, the term of this patent is extended or adjusted under 35 U.S.C. 154(b) by 564 days.

(21) Appl. No.: 11/965,032

(22) Filed: Dec. 27, 2007

(65) Prior Publication Data

US 2008/0290311 A1    Nov. 27, 2008

Related U.S. Application Data

(60) Provisional application No. 60/878,478, filed on Jan. 3, 2007.

(51) Int. Cl.
*F16K 31/12* (2006.01)
(52) U.S. Cl. .............................. 251/40; 251/331; 92/100
(58) Field of Classification Search ................... 251/40, 251/41, 331; 92/96, 100
See application file for complete search history.

(56) References Cited

U.S. PATENT DOCUMENTS

| | | | |
|---|---|---|---|
| 1,714,573 A | 5/1929 | Sloan |
| 1,858,470 A | 5/1932 | Sloan |
| 2,270,259 A | 1/1942 | Burke |
| 2,776,812 A | 1/1957 | Colendar |
| 3,155,366 A | 11/1964 | Rasmussen |
| 3,399,860 A | 9/1968 | Billeter et al. |
| 3,768,771 A | 10/1973 | Dicken, Jr. |
| 4,202,525 A | 5/1980 | Govaer et al. |
| 4,327,891 A | 5/1982 | Allen et al. |
| 4,817,913 A | 4/1989 | Whiteside |
| 5,013,007 A | 5/1991 | Whiteside |
| 5,150,877 A | 9/1992 | Whiteside et al. |
| 5,213,305 A | 5/1993 | Whiteside et al. |
| 5,232,194 A | 8/1993 | Saadi et al. |
| 5,295,655 A | 3/1994 | Wilson et al. |
| 5,332,192 A | 7/1994 | Whiteside |
| 5,335,694 A | 8/1994 | Whiteside |
| 5,490,659 A | 2/1996 | Whiteside |
| 5,887,848 A | 3/1999 | Wilson |
| 5,967,182 A | 10/1999 | Wilson |
| 6,105,926 A | 8/2000 | Oliver et al. |
| 6,182,689 B1 | 2/2001 | Lauer et al. |
| 6,216,730 B1 | 4/2001 | Hall |
| 6,260,576 B1 | 7/2001 | Allen |
| 6,299,128 B1 | 10/2001 | Verdecchia |
| 6,382,586 B1 | 5/2002 | Wilson et al. |
| 6,408,873 B1 | 6/2002 | Hall et al. |
| 6,499,716 B2 | 12/2002 | Nortier |
| 6,616,119 B2 | 9/2003 | Wilson |
| 6,913,239 B2 | 7/2005 | Nortier |
| 6,923,425 B2 | 8/2005 | Verdecchia |
| 6,923,426 B1 | 8/2005 | Pino |
| 6,926,247 B2 | 8/2005 | Nortier |
| 7,059,578 B2 | 6/2006 | Frenkel |
| 2001/0028048 A1 | 10/2001 | Verdecchia |
| 2002/0005500 A1 | 1/2002 | Verdecchia |
| 2002/0117641 A1 | 8/2002 | Nortier |
| 2002/0179871 A1 | 12/2002 | Verdecchia |
| 2003/0042446 A1 | 3/2003 | Wilson |
| 2004/0094734 A1 | 5/2004 | Funari et al. |
| 2005/0205815 A1 | 9/2005 | Frenkel |
| 2005/0224735 A1 | 10/2005 | Funari et al. |

*Primary Examiner* — John K Fristoe, Jr.
(74) *Attorney, Agent, or Firm* — The Webb Law Firm

(57) ABSTRACT

A flush valve diaphragm of a flush valve includes a body having a segmented insert within a flexible body portion and a central passageway. The body further includes a peripheral sealing portion with the flexible body portion within the peripheral sealing portion. The peripheral sealing portion can include an integral filter, an exit chamber and a bypass arrangement, such that water flowing through the filter flows through the bypass arrangement. The integral filter version will retard clogging of the bypass arrangement. The segmented insert includes a plurality of trapezoidal members with outward protrusions. The plurality of trapezoidal members are connected to each other on their outermost edge by a runner.

32 Claims, 8 Drawing Sheets

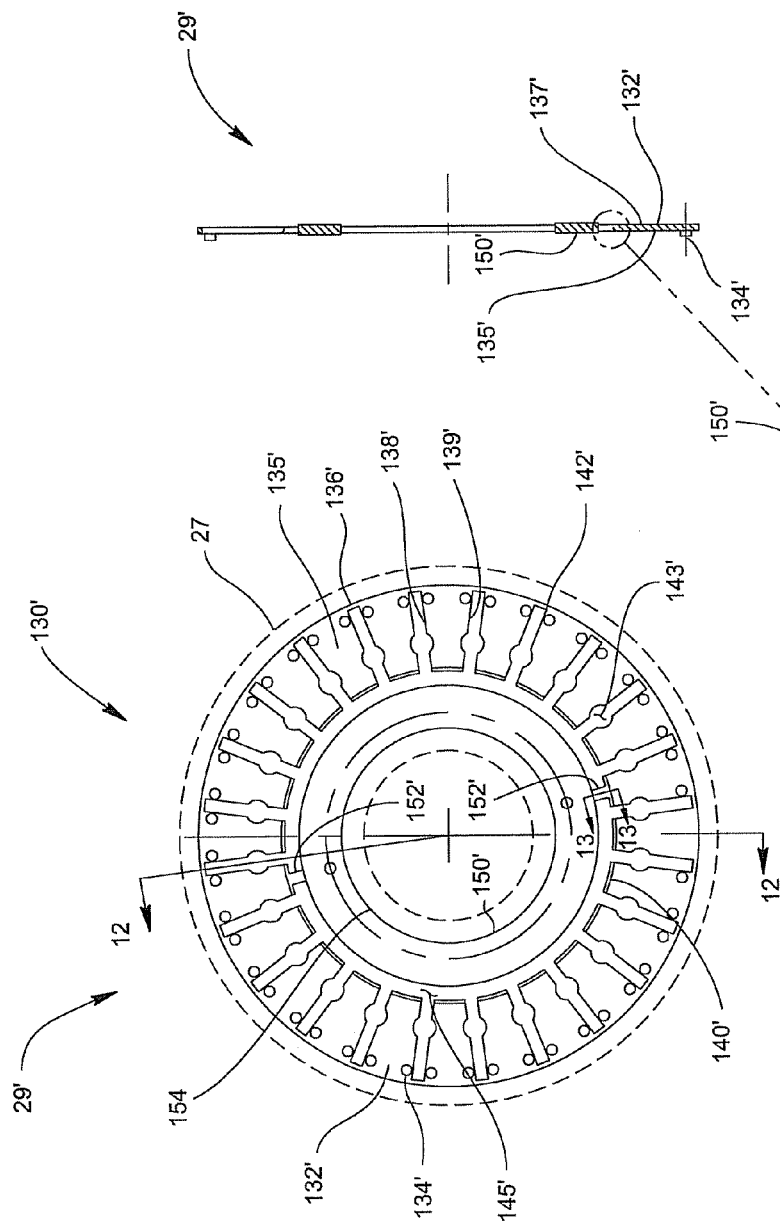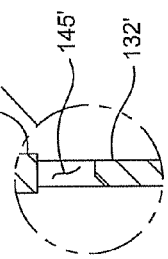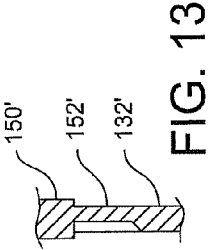

DIAPHRAGM WITH SEGMENTED INSERT

CROSS REFERENCE TO RELATED APPLICATIONS

This application claims the benefit of U.S. Provisional Application Ser. No. 60/878,478 filed Jan. 3, 2007 and titled "DIAPHRAGM WITH SEGMENTED INSERT." The disclosure and specification of U.S. Provisional Application Ser. No. 60/878,478 is hereby incorporated by reference.

BACKGROUND OF THE INVENTION

1. Field of the Invention

The present invention relates to flexible diaphragms used in flush valves, and more particularly, to flexible diaphragms with a segmented insert used in flush valves.

2. Description of Present Technology

Flush valves in water closets, urinals, and other plumbing devices, which utilize a flexible diaphragm to establish, and to seal off, the connection between the inlet and outlet sides of the flush valve are well-known in the art. Typically, the diaphragm is made of an elastomeric material, such as rubber, and includes a bypass orifice, which provides fluid communication between the inlet side of the flush valve and an upper chamber of the flush valve. An example of a typical diaphragm is shown in FIG. 1 of U.S. Pat. No. 5,232,194 to Saadi et al. (hereinafter also referred to as the "Saadi patent"); the disclosure of the Saadi patent is incorporated herein by reference.

The time cycle during which fluid, e.g. water, flows through the flush valve varies depending on the time it takes for a pressure drop to occur between the opposite sides of the diaphragm due to water passing through a bypass orifice into the upper chamber of the flush valve. Specifically, a pressure difference across the diaphragm causes water to pass through the flush valve for a fixed period of time when the flush valve is activated. As can now be appreciated, the bypass orifice of the diaphragm-type flush valves acts as a timing device. A detailed discussion of the operation of a diaphragm used with a flush valve can be found in column 1, lines 11-58 of the Saadi patent.

Recently, there has been some interest in filtering the water passing around the diaphragm to prevent clogging of the bypass orifice, which could undesirably effect the time period during which the flush valve is activated and/or the time of the flush valve refill cycle. U.S. Pat. No. 6,923,425 B2 to Verdecchia (hereinafter also referred to as the "Verdecchia patent"), which patent is hereby incorporated by reference, discloses a filtration system for preventing the clogging of the bypass orifice. In general, the Verdecchia patent discloses a flush valve diaphragm that includes a body portion and a peripheral sealing portion with the peripheral sealing portion including an integral filter. The integral filter prevents clogging of the bypass orifice. Although the presently available diaphragms are acceptable to prevent clogging of the bypass orifice, there are limitations. More particularly, the presently available diaphragms include a plurality of bendable or flexible metal inserts embedded in a rubber body to maintain the contour of the diaphragm as the upper surface of the diaphragm transitions from a concave shape to a convex shape, and the bottom surface, transitions from a convex shape to a concave shape, as the flush valve goes from the closed position to the open position.

Although metal plates are acceptable for use as inserts in flexible diaphragms of flush valves, it is appreciated by those skilled in the art, that it would be advantageous to have flexible diaphragms having a bendable insert of a different material that is lighter in weight than a plurality of metal inserts, and flexible diaphragms that are less expensive than diaphragms having a plurality of metal inserts.

SUMMARY OF THE INVENTION

This invention relates to a flush valve diaphragm having, among other things, a body having a flexible body portion and a segmented insert within the flexible body portion. The body includes, among other things, a central passageway; a peripheral sealing portion comprising a sealing ring extending along the periphery of the body, the sealing portion with a thickness greater than the thickness of portion of the body within the sealing ring, wherein the flexible body portion is within the peripheral sealing portion; a first integral ring on a first side of the body radially spaced from the sealing ring; a second integral ring on an opposite second side of the body radially spaced from the sealing ring; an integral filter integrally formed in the body located between the sealing ring and the first integral ring between the sealing ring and the second integral ring, and a bypass chamber positioned between the first integral ring and the sealing ring; an exit chamber positioned between the second integral ring and the sealing ring; a bypass orifice extending from and allowing fluid communication between the bypass chamber and the exit chamber. The segmented insert includes, among other things, a plurality of trapezoidal members with protrusions extending outward from a major surface of the trapezoidal members, wherein the plurality of trapezoidal members are connected to each other on their outermost edge by a runner.

The present invention is also directed to an improvement to a flush valve diaphragm of the type having a flexible rubber body and a metal insert embedded in the rubber body. The flush valve diaphragm is used with water closets and urinals, which utilize the flexible diaphragm to establish, and to seal off, the connection between the inlet and outlet sides of a flush valve. The improvement includes, among other things, the flush valve diaphragm including, among other things, a plastic segmented insert embedded in a body made of a thermoplastic elastomer. The plastic segmented insert, includes, among other things, a plurality of trapezoidal members with protrusions extending outward from a major surface of the trapezoidal members, wherein the plurality of trapezoidal members are connected to each other on their outermost edge by a runner.

The advantages of the present invention will be clarified in the description of the preferred embodiment taken together with the attached drawings.

BRIEF DESCRIPTION OF THE DRAWINGS

FIG. 11 is a top plan view of a second embodiment of a segmented insert made in accordance with the present invention;

FIG. 12 is a sectional side view taken along lines 12-12 of FIG. 11; and

FIG. 13 is a sectional side view taken along lines 13-13 of FIG. 11.

DESCRIPTION OF THE PREFERRED EMBODIMENT(S)

Figure 1:
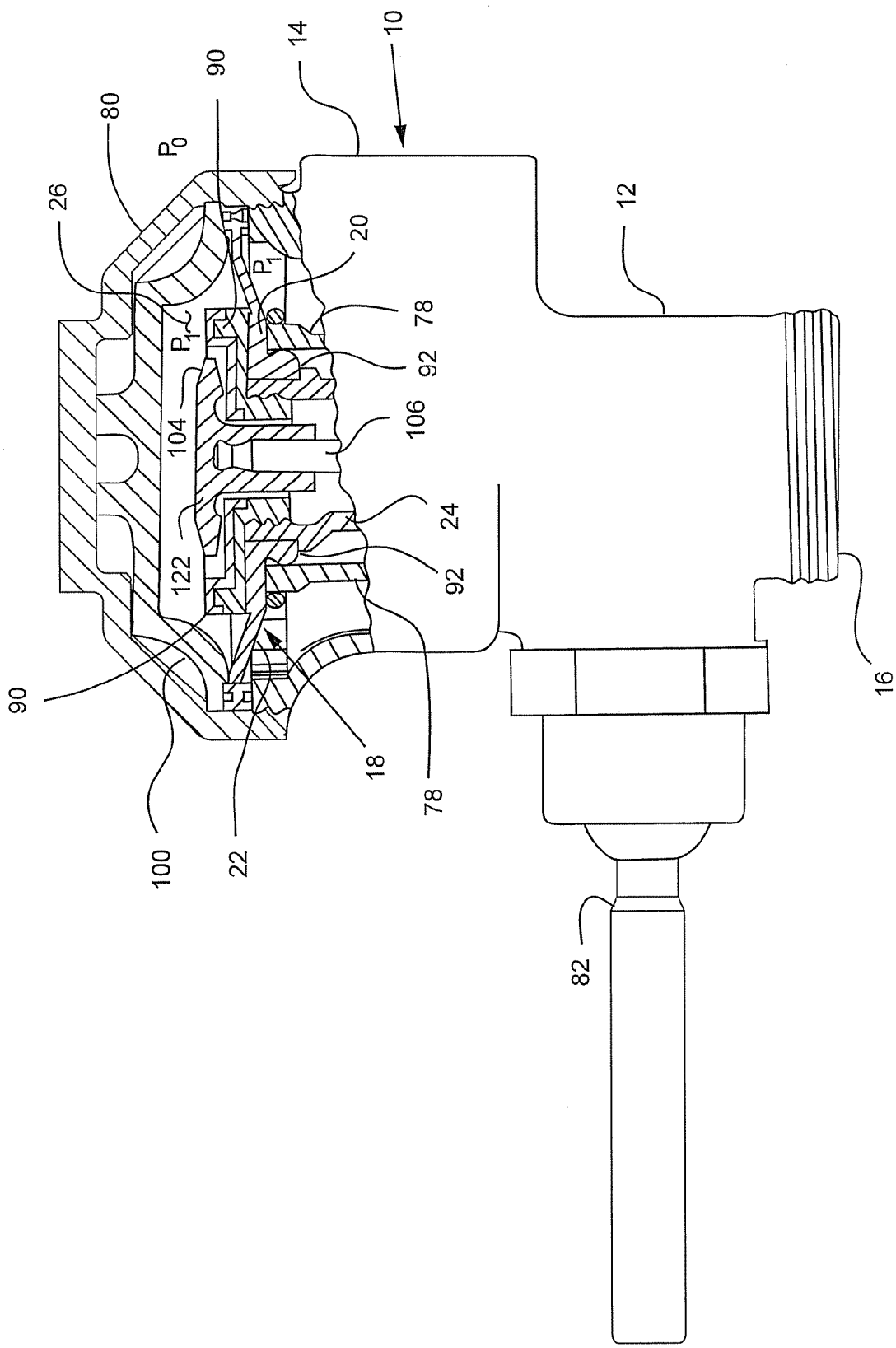
FIG. 1 is a partial sectional elevational view of a flush valve assembly in a closed position incorporating features of the invention.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.7, or 3.2 to 8.1, or 5.5 to 10.

Before discussing non-limiting embodiments of the invention, it is understood that the invention is not limited in its application to the details of the particular non-limiting embodiments shown and discussed herein since the invention is capable of other embodiments. Further, the terminology used herein to discuss the invention is for the purpose of description and is not of limitation. Still further, unless indicated otherwise, in the following discussion like numbers refer to like elements.

The present invention is directed to a flexible diaphragm having a flexible body and a segmented insert embedded in the flexible body for use in a flush valve, for example but not limiting to the invention, a flush valve of the type disclosed in the Verdecchia patent and shown in FIG. 1. For a better appreciation of the invention, the discussion will first be directed to the major components of the flush valve; will then be directed to the features of the outer surface of the flexible body of the diaphragm having the segmented insert of the invention; will thereafter be directed to the operation of the flush valve, and will lastly be directed to the features of the segmented insert of the invention embedded in the flexible body of the diaphragm.

Figure 2:
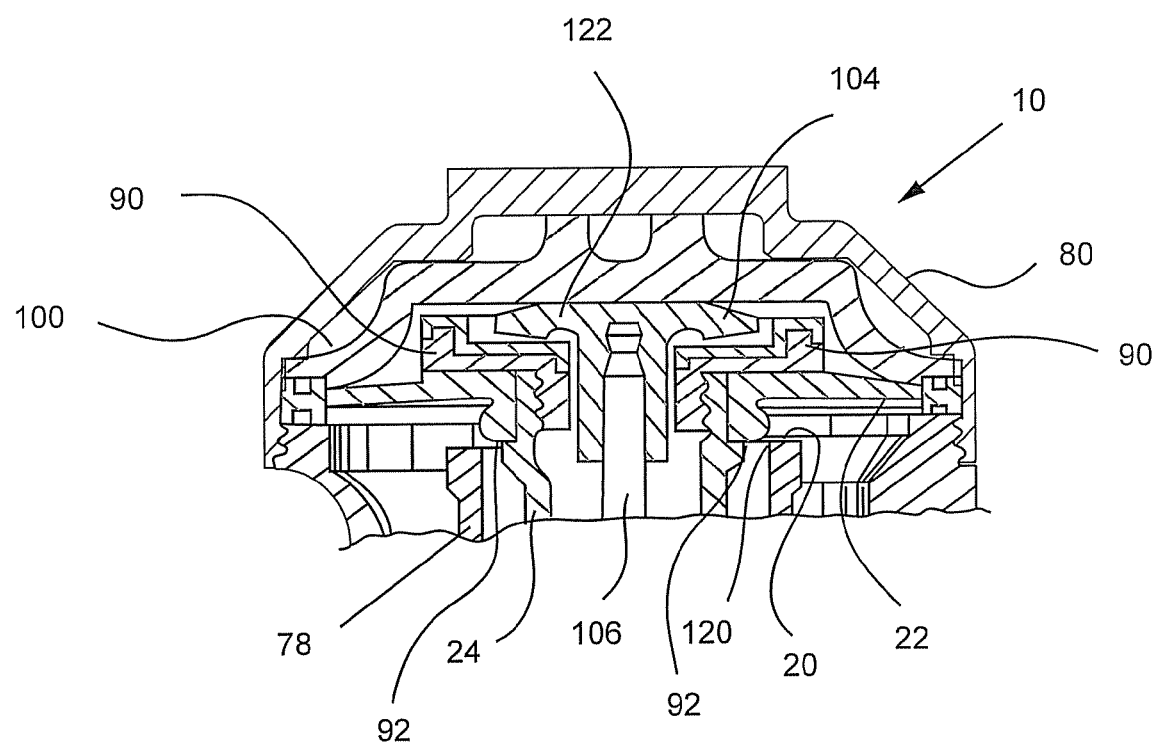
FIG. 2 is a sectional elevational view of a portion of the flush valve assembly shown in FIG. 1 in an open position.

As shown in FIG. 1, the flush valve 10 includes a valve body 12 having an inlet opening 14, an outlet opening 16, a flush valve diaphragm assembly 18, movable to a closing position on valve seat 20 positioned between the inlet opening 14 and the outlet opening 16 to stop flow, e.g. water flow between inlet opening 14 and outlet opening 16. The flush valve diaphragm assembly 18 includes a flexible diaphragm 22 incorporating features of the invention peripherally attached to a barrel slide 24. A pressure chamber 26 is defined above the flexible diaphragm 22 for holding the flush valve diaphragm assembly 18 on the valve seat 20. Referring to FIGS. 1 and 2, the flush valve 10 further includes a barrel 78 receiving the barrel slide 24, and a top cap 80. The top cap 80 is threadably secured to valve body 12. A handle 82 (shown in FIG. 1) is provided in the valve body 12 to move the barrel slide 24 toward the top cap 80 to activate the flush valve diaphragm assembly 18, for example but not limited to the manner disclosed in the Saadi patent.

With continued reference to FIGS. 1 and 2, the barrel slide 24 is secured to flexible diaphragm 22 through a locking member 90. In one non-limiting embodiment of the invention, the locking member 90 is threadably received by the barrel slide 24, thereby sandwiching a portion of diaphragm 22 between lip 92 on the barrel slide 24 and the locking member 90. The flush valve diaphragm assembly 18 can also be molded or formed as a single unitary piece.

An inner cover 100 is provided and positioned inwardly and adjacent to the top cap 80. A relief valve or trip mechanism 104 is provided and positioned adjacent to the locking member 90 threaded to the barrel slide 24. The relief valve or trip mechanism 104 rests on the locking member 90 and is tripped through handle 82 in a manner well known in the art, such as, but not limited to that disclosed in the Saadi patent. The relief valve 104 includes an upper circular sealing disk 122 and an elongated stem 106 attached thereto which co-acts with the handle 82.

Figure 3:
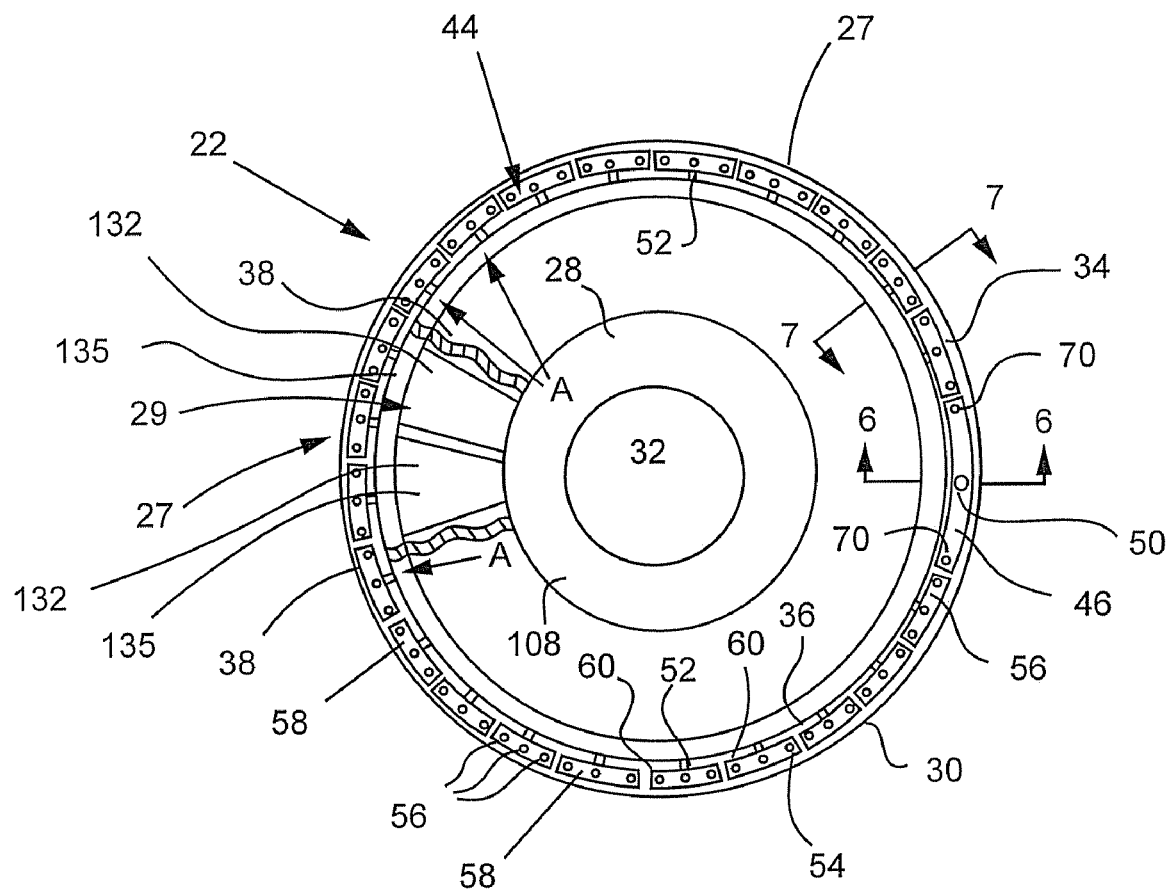
FIG. 3 is a bottom plan view having portions removed for purposes of clarity of a flush valve diaphragm incorporating features of the invention.
Figure 4:
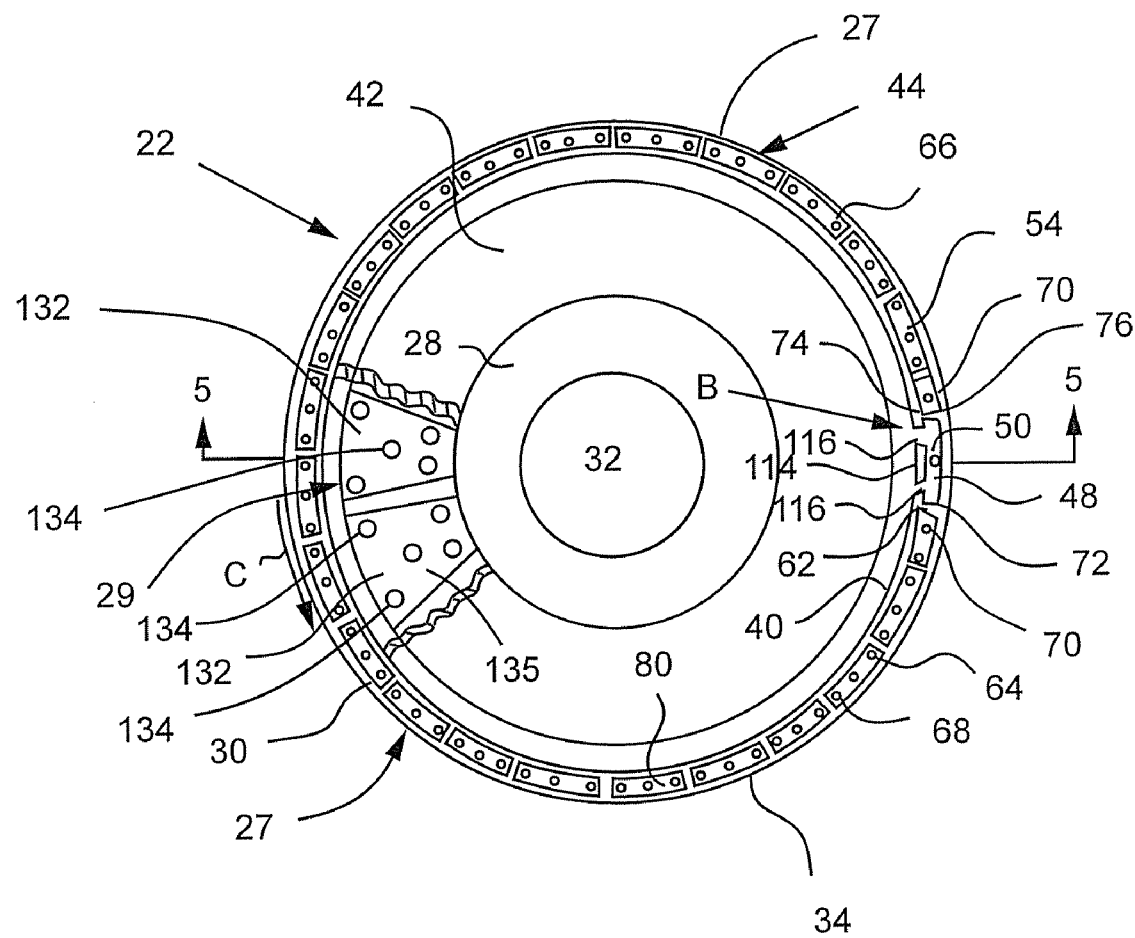
FIG. 4 is a top plan view having portions removed for purposes of clarity of the flush valve diaphragm shown in FIG. 2.
Figure 5:
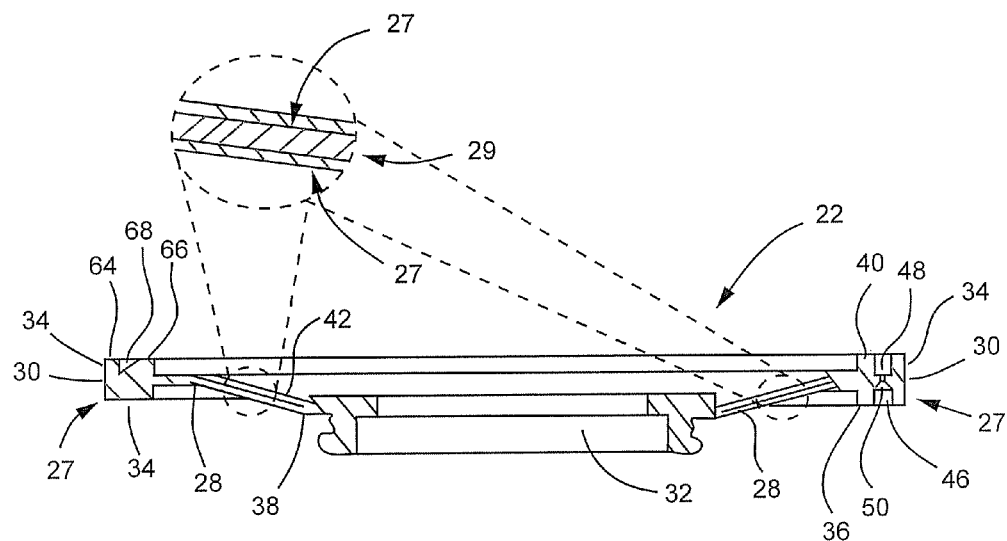
FIG. 5 is a section taken along the lines 5-5 shown in FIG. 4.

The discussion is now directed to the configuration of the diaphragm 22 having features of the invention. Referring to FIGS. 3 and 4, in a non-limiting embodiment of the invention, the flexible diaphragm 22 includes a flexible body 27 having a segmented insert 29 of the invention. The invention is not limited to the outer configuration of the flexible body 27, and any outer configuration of a flexible body of a diaphragm of a flush valve known in the art can be used with the segmented insert 29 of the invention. In one non-limiting embodiment of the invention, the body 27 has the outer configuration of the diaphragm disclosed in the Verdecchia patent. More particularly, the flexible body 27 of the diaphragm 22 has a body portion 28 and a peripheral sealing portion 30. The body portion 28 has a central passageway 32. The peripheral sealing portion 30 includes a sealing ring 34 with a thickness greater than the body portion 28 extending along the periphery of the flexible diaphragm 22 (see also FIG. 4). The body 27 of the flexible diaphragm 22 also includes a first integral ring 36 (shown in FIG. 3) on a first side 38 of the flexible diaphragm 22 radially spaced from the sealing ring 34 (shown in FIG. 3). A second integral ring 40 (shown in FIG. 4) on a second side 42 of the flexible diaphragm 22 is radially spaced from the sealing ring 34. An integral filter 44 is located between the sealing ring 34 and the first integral ring 36, and between the sealing ring 34 and the second integral ring 40. A bypass chamber 46 is positioned between the first integral ring 36 and the sealing ring 34 (see FIG. 3). An exit chamber 48 is positioned between the second integral ring 40 and the sealing ring 34 (see FIG. 4). At least one bypass orifice 50 (see FIGS. 5 and 6) extends from and allows fluid communication between the bypass chamber 46 and the exit chamber 48. The bypass orifice 50 connects the inlet opening 14 and the pressure chamber 26. The integral filter 44 includes a plurality of circumferentially spaced filter passages 54 defined in the flexible diaphragm 22 (see FIG. 7). The filter passages 54 extend from the first side 38 of the diaphragm 22, through the diaphragm 22, to the second side 42 of the diaphragm 22.

Figure 7:
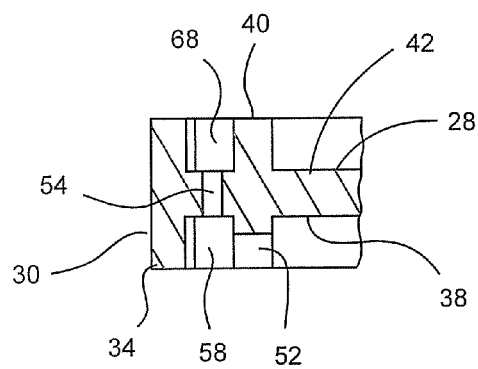
FIG. 7 is an elevational view partially in section of a portion of the diaphragm taken along lines 7-7 shown in FIG. 3.

The first side or the bottom side 38 of the flexible diaphragm 22 as mounted in the flush valve 10 includes the first integral ring 36, which includes a plurality of circumferentially spaced support grooves 52 (see FIGS. 3 and 7). The support grooves 52 are in fluid communication with the inlet opening 14. Each support groove 52 is only in fluid communication with a specific set of filter orifices 56. Each respective support groove 52 and respective set of filter orifices 56 (see FIG. 3) are in fluid communication with a respective chamber 58, with the chambers 58 being separated from each other. A plurality of radially extending chamber walls 60, which are circumferentially spaced apart extend from the first integral ring 40 to sealing ring 34. The chambers 58 are defined by two adjacent ones of the chamber walls 60, portions of the sealing ring 34, and the first integral ring 36, and include one of the support grooves 52 and a set of the filter orifices 56.

In one non-limiting embodiment of the invention, the body 27 of the flexible diaphragm 22 is made of an elastomeric material, which includes, but is not limited to, natural rubber, synthetic rubber, synthetic polymers, and thermoplastic elastomer resins. The central passageway 32 is defined by an inner perimeter of the body portion 28 to provide the diaphragm 22 with has an annular-shaped. The support grooves 52 (see FIG. 7) are substantially larger than filter passages 54 and do not provide any filtering function for the bypass orifice 50 (see FIG. 3) or for the filter passages 54. The structure defining the support grooves 52 provides support for the flexible diaphragm 22. The filter passages 54 are in fluid communication with a circumferential passageway 64 (see FIG. 4) defined on the second side or top side 42 of flexible diaphragm 22 as mounted in the flush valve. The circumferential passageway 64 includes a first dam wall 62 at a first end 72 adjacent one side of the exit chamber 48, a second dam wall 74 at a second end 76 adjacent the other side of the exit chamber 48, and a plurality of circumferential supports 66 having flow through passages 68 (see FIG. 7), which do not provide a filtering function. At least one flow path orifice 70 is defined in the circumferential passageway 64 to direct filtered water to bypass chamber 46 (see FIG. 3) defined on first side or bottom side 38 of flexible diaphragm 22 as mounted in the flush valve.

In one non-limiting embodiment of the invention, there are two flow path orifices 70, one adjacent to the first dam wall 62 and one adjacent to the second dam wall 74 (see FIGS. 3 and 4). The filtered water passes through the bypass orifice 50, which has a flow area greater than filter passages 54, but less than support grooves 52 (see FIG. 7), and the filtered water is then directed to the high-pressure side (the second side 42) of the flexible diaphragm 22. The outer peripheral sealing ring 34 is defined on flexible diaphragm 22 and is radially spaced or offset from the support grooves 52 and the filter passages 54. The support grooves 52 and the chambers 58 are not in fluid communication with each other, in normal operation of flush valve 10, when the water or liquid flows from the support grooves 52 to the flow path orifices 70. In one non-limiting embodiment, the size of the support grooves 52 is approximately 0.060" wide.times.0.070" high. The sealing ring 34 that extends along the outer periphery of diaphragm 22 forms a liquid seal with the valve body 12, the top cap 80, and the inner cover 100 of the flush valve.

Figure 8:
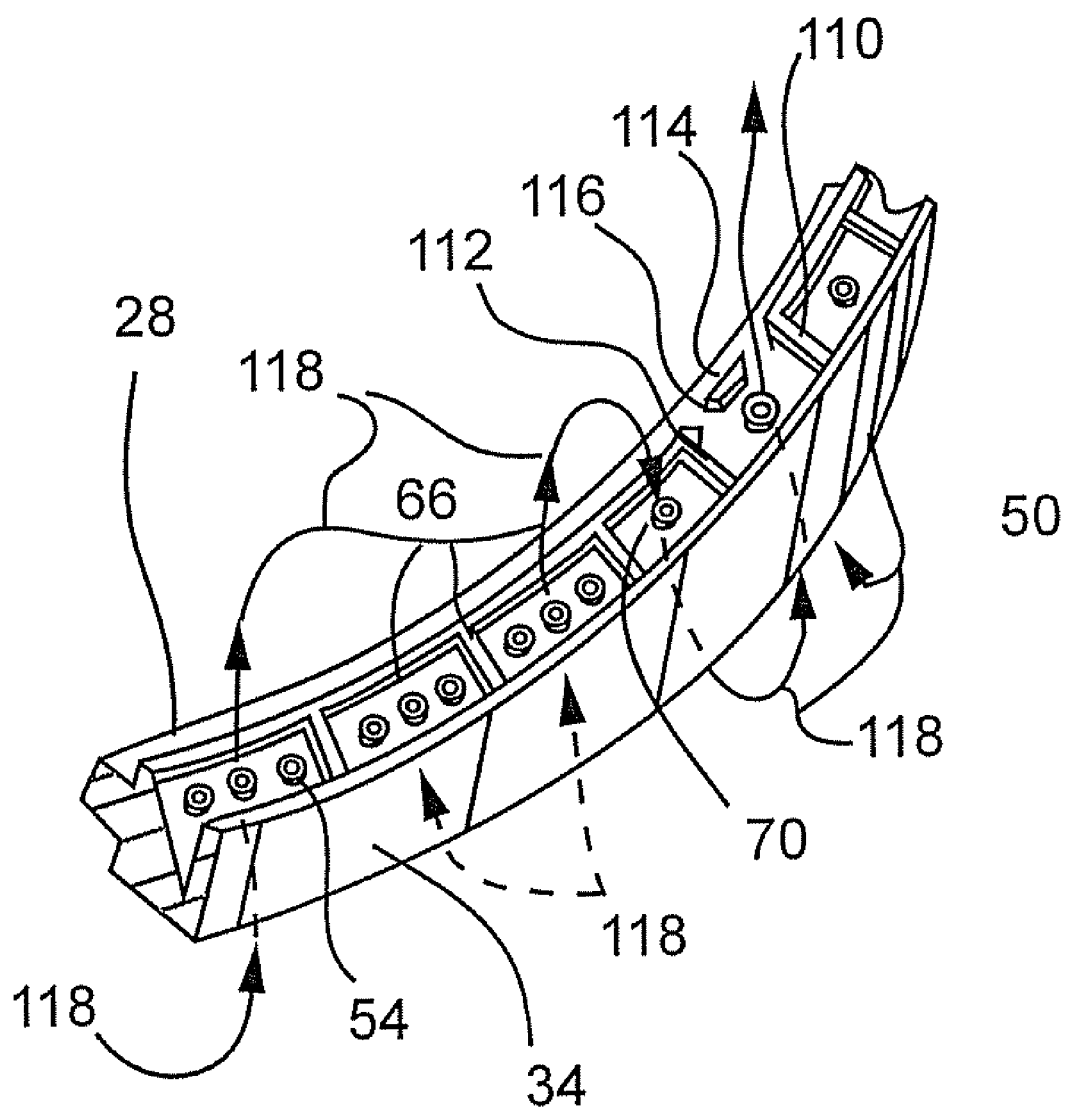
FIG. 8 is a partial perspective view of a circumferential edge portion of the diaphragm shown in FIG. 4.

As shown in FIG. 4, the exit chamber 48 is defined by the first dam wall 62, the second dam wall 74, a diverter shield 114, and includes at least one exit passage 116 (two shown in FIG. 4), and the bypass orifice 50. The exit passages 116 are defined by the space between the first dam wall 62 and the second dam wall 74 and the diverter shield 114. The bypass orifice 50 is defined within the exit chamber 48 and the diaphragm 22 and is in fluid communication with the bypass chamber 46 defined on the first side 38 of the flexible diaphragm 22. With reference to FIGS. 3, 4 and 8, in the present arrangement of the non-limiting embodiment under discussion, unfiltered water from inlet opening 14 passes through the support grooves 52 (as shown by arrow A in FIG. 3), travels a serpentine path 118 shown in FIG. 8 that includes path C shown in FIG. 4, then exits as filtered water through exit chamber 48 (see FIGS. 5 and 6) on the second side 42 of the flexible diaphragm 22 via exit passages 116 (see FIG. 8) into the pressure chamber 26 (one of the exit passageways 116 shown by arrow B in FIG. 4). By filtering, it is meant that filter passages 54 remove from the water particulates and debris that are larger than the diameter of filter passage 54, so as to prevent clogging of bypass orifice 50, which has a larger diameter than filter passage 54.

The bypass chamber 46 (see FIGS. 5 and 6) is defined by a portion of the sealing ring 34, a portion of the first integral ring 36, a first end support 110, and a second end support 112. The end supports 110, 112 extend from the sealing ring 34 to the first integral ring 36. The bypass chamber 46 includes the bypass orifice 50 and at least one flow path orifice 70 (see FIGS. 3 and 4).

The first integral ring 36, defining support grooves 52, provides support for the diaphragm 22. The filter passages 54 are in fluid communication with the circumferential passageway 64 defined on the second side 42 of diaphragm 22. Water passing through the filter passages 54 becomes filtered. The circumferential passageway 64 has a plurality of circumferential supports 66 having flow through passages 68 which provide no filtering function and have a right triangular flow dimension of about 0.070" high at the perpendicular leg and 0.085" wide at the base (see FIG. 5). The circumferential supports 66 can alternatively have a U-shaped cross section. The two flow path orifices 70 defined in the circumferential passageway 64 direct filtered water to the bypass chamber 48 defined on the first side 38 of the diaphragm 22. The filtered water then passes through bypass the orifice 50, which has a flow area greater than the filter passages 54, but less than the support grooves 52 and flows through the passages 68. Filtered water is then directed to the high-pressure side (second side 42) of diaphragm 22 adjacent pressure chamber 26. Although the bypass orifice 50 is shown to be integrally formed in the body 27 of the diaphragm 22, a separate insert having bypass orifices 50 can be provided and secured in the diaphragm 22. In a presently preferred embodiment, the diameter of bypass orifice 50 is 0.020" and the diameter of filter passage 54 is 0.014". The other flow paths have flow diameters greater than 0.020".

The discussion is now directed to a general description of the operation of the flush valve. In a normally closed position, as is shown in FIG. 1, water pressure $P_1$, which is greater than atmospheric pressure $P_0$, is communicated to pressure chamber 26 at inlet opening 14 through bypass orifice 50 (see FIGS. 3 and 4). Since the surfaces which are subjected to the water pressure $P_1$ are greater on second side 42 of diaphragm 22 (see FIG. 4), the water pressure forces diaphragm 22 down onto valve seat 20, preventing water from flowing through outlet opening 16. Referring to FIG. 2, when a user moves the handle 82 in any direction, a plunger 82 (see FIG. 1) moves inwardly, tilting the elongated stem 106 of the relief valve 104. This action creates an opening 120 between the diaphragm 22 and the valve seat 20 releasing the pressure in the pressure chamber 26 by allowing water to flow through the barrel 78 as shown in FIG. 2. With the pressure in the pressure chamber 26 relieved, the water inlet pressure forces the diaphragm 22 to move upwardly, off of the valve seat 20, allowing water to flow directly from the inlet opening 14, through the opening 120, the barrel 78, and the outlet opening 16. When the diaphragm 22 and the relief valve 104 move upwardly, the relief valve resets itself, closing off the pressure chamber. Water will then flow through the circumferentially spaced support grooves 52 (see FIG. 7) and through the respective set 56 of the filter passages 54 (see FIG. 3). The water will then flow through the circumferential passageway 64 and respective flow through the passages 68 to the respective flow path orifices 70 via the path 118 (FIG. 8). The filtered water will flow downward to the first side 38 of the diaphragm 22 into the bypass chamber 46 and through the bypass orifice 50. The filtered water then flows into the exit chamber 48 and the exit passages 116 (see FIG. 3) into the pressure chamber 26 until the diaphragm 22 is again forced against the valve seat 20, thereby closing the flush valve 10. During the closing of the flush valve 10, the barrel slide 24 moves downwardly with the diaphragm 22 and the outwardly extended flexible flow ring 88. The flow ring 88 contacts the barrel 78, again thereby minimizing water hammer effects and acting as a first seal until the radially inwardly seating surface 86 is sealed against the valve seat 20.

The superior filtering of water prior to the water flowing through the bypass orifice 50 prevents clogging of the bypass orifice 50. Further, the bypass orifice 50 includes a tapered hole arrangement, as disclosed in FIG. 6 and which is described in detail in the Verdecchia patent, to prevent clogging of the bypass orifice should the diameter of the filtering passages 54 increase due to wear or tearing of the diaphragm 22 and provide no filtering function, alternatively, a cylindrical hole may be provided.

In a non-limiting embodiment of the invention, and with reference to FIGS. 3 and 4, the chambers 58 are defined by a portion of the valve body 12, the peripheral seal 30, the first side 38 of diaphragm 22, and a portion of the first integral ring 36. Flow of water into each chamber 58 is only accomplished through a respective one of the support grooves 52, and flow can only exit the chamber 26 via a respective set 56 of filter passages 54. Passageway 64 is defined by a portion of the second side 42 of diaphragm 22, a portion of inner cover 100 (see FIG. 1), a portion of the second integral ring 40, which is coaxial with the first integral ring 36, the supports 66, the dam walls 62, 74, and a portion of the peripheral seal 30 (see FIGS. 2 and 3). Flow into the passageway 64 can only occur via filter passages 54, and flow exiting the passageway 64 can only occur through the flow path orifices 70. The bypass chamber 46 is defined by a portion of the first side 38 of diaphragm 22, a portion of the valve body 12, first end support 110 (see FIG. 8), second end support 112, portions of the peripheral seal 30, and the integral ring 36. Flow into bypass chamber 46 can only occur via the flow path orifices 70, and flow exits the bypass chamber 46 via the bypass orifice 50. The exit chamber 48 is defined by a portion of the peripheral seal 30, a portion of the second side 42 of the diaphragm 22, the first and the second dam walls 62 and 74, respectively, the inner cover 100, portions of the second integral ring 40, and the shield 114. Flow into the exit chamber 48 occurs via the bypass orifice 50 and exits the chamber 48 via the exit passages 116 into the pressure chamber 26. Fluid seals are formed between the interaction of the diaphragm 22 and respective contacting or clamping surfaces of the valve body 12, top cap 80, and inner cover 100.

Figure 6:
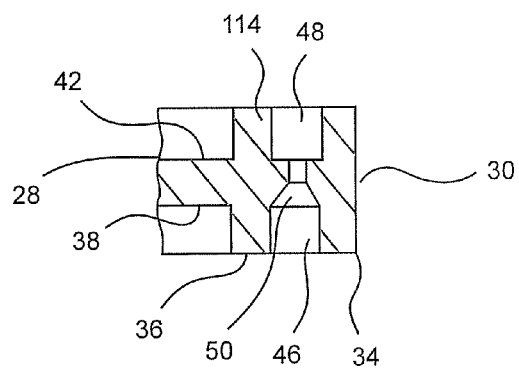
FIG. 6 is an elevational view partially in section of a portion of a flush valve taken along lines 6-6 shown in FIG. 3

With reference to FIGS. 6 and 7 as needed, in lieu of providing the filter passages 54 defined in the diaphragm 22, the filtering takes place via the plurality of the support grooves 52. In this arrangement, the support grooves 52 have an effective flow diameter less than the diameter of the bypass orifice 50. Further, the supports 66 (see FIG. 4) are eliminated so that all of the chambers 58 are in fluid communication on the first side 38 of diaphragm 22. The circumferentially spaced passages 54 and the flow path orifices 70 are eliminated so that the filtered water would flow directly to the bypass orifice 50. This arrangement would utilize a unitary diaphragm filter arrangement as opposed to a two-piece arrangement.

The discussion is now directed to a non-limiting embodiment of the segmented insert 29 (see FIGS. 9 and 10) surrounded by the flexible body 27 (see FIGS. 3 and 4) to embed the segmented insert 29 in the flexible body 27 of the diaphragm 22.

Figure 9:
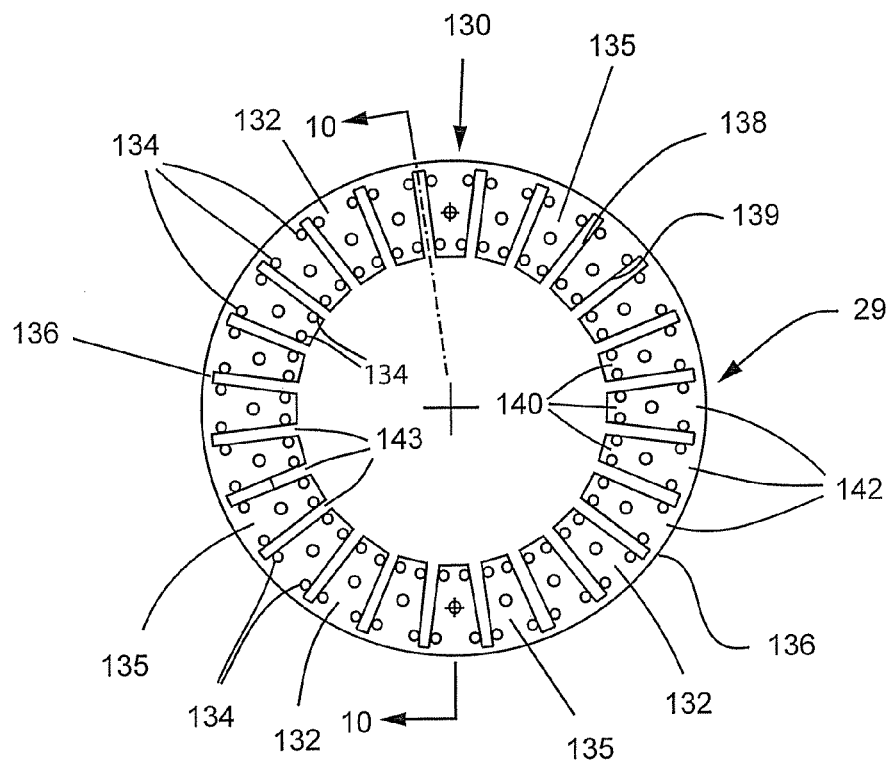
FIG. 9 is a top plan view of a non-limited embodiment of a segmented insert of the present invention.
Figure 10:
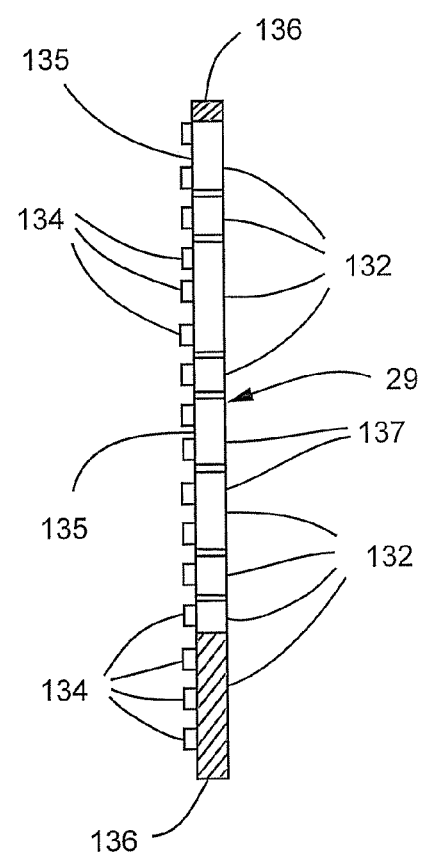
FIG. 10 is a sectional side view taken along lines 10-10 of FIG. 9.

FIGS. 9 and 10 illustrate a segmented insert 29 made in accordance with the present invention. The segmented insert 29 is preferably made of polypropylene in any convenient manner, e.g. but not limited to injection molding. The segmented insert 29 includes a plurality of segmented members 132 with protrusions 134 extending outward from side 135 of the segmented members. As clearly shown in FIG. 9, but not limiting to the invention each segmented member 132 has five protrusions 134, although the number of protrusions or spacers 134 may be varied, e.g. the segments can have less than or more than five. Opposite side 137 (see FIG. 10) of the segmented members 132 is preferably smooth, that is, has no protrusions extending therefrom. The protrusions 134 act as spacers during the molding process of the diaphragm 22. The segmented members 132 have two side edges 138, 139, one inner edge 140 and one outer edge 142 and can be trapezoidal in shape. The segmented member 132 can preferably have the same geometric shape and can take the form of other quadrilateral shapes as well as other shapes. Each of the plurality of segmented members 132 is connected on their respective outer edges 142 to inner surface of a runner or a closed ring 136 with a space 143 between adjacent segmented member 132. In this manner, the center portion of the diaphragm 130 having the segmented insert 29 can be flexed when the flush valve 10 moves from the is open position to the closed position and vice versa. Preferably, the inner edges 142 define an annulus that has a diameter greater than the passageway diameter 32 and the outer edges 142 define an outer diameter of the segmented insert 29 that is less than the outer diameter of the diaphragm 22, so that the segmented insert may be completely embedded within the flexible body 27 of the diaphragm 22.

Referring to FIGS. 3 and 4, the insert 29 is integrally molded within the material of the flexible body 27 to provide the flexible diaphragm 22. The flexible diaphragm 22 of the invention is more rigid than the diaphragm of the prior art, e.g. but not limited to the diaphragm of U.S. Pat. No. 4,327,891 in the radial direction because of the segmented insert 29. As is evident, the segmented insert 29 is integrally fused with the material of the flexible body 27 so the segmented insert 29 is not visually detectable by the outward appearance of the diaphragm 22. Preferably, the material of the flexible body 27 is made of an elastomeric polymer, more specifically, thermoplastic elastomer (TPE), and the TPE is injection molded around the segmented insert 29 to form the diaphragm 22. It is preferable that the TPE is santaprene. The protrusions or spacers 134 of the segmented members assist in permitting the TPE to flow around the segmented members 132 and protrusion 134 of the segmented insert 29. Polypropylene easily bonds to TPE. Optionally, the side 137 of the segmented members can have protrusions 134. Although not shown, the segmented insert 29 need not be completely surrounded by TPE of the flexible body 27. In another preferred embodiment, the segmented insert 29 is molded to the body, except side 137 of segmented members is exposed and not covered by TPE.

FIGS. 11-13 illustrate a second embodiment of a segmented insert 29' made in accordance with the present invention which can be used in lieu of segmented insert 29. The segmented insert 29' is preferably made of polypropylene in any convenient manner, e.g. but not limited to injection molding. The segmented insert 29' includes a plurality of segmented members 132' with protrusions 134' extending outward from side 135' of the segmented members. As clearly shown in FIG. 11, but not limiting to the invention each segmented member 132' has two protrusions 134', although the number of protrusions or spacers 134' may be varied, e.g. the segments can have less than or more than two. Opposite side 137' (see FIG. 12) of the segmented members 132' is preferably flat, that is, has no protrusions extending therefrom. The protrusions 134' act as spacers during the molding process of the diaphragm 22'. The segmented members 132' have two side edges 138', 139', one inner edge 140' and one outer edge 142' and can be substantially trapezoidal in shape. The segmented member 132' can preferably have the same geometric shape and can take the form of other quadrilateral shapes as well as other shapes. Each of the plurality of segmented members 132' is connected on their respective outer edges 142' to inner surface of a runner or a closed ring 136' with a space 143' between adjacent segmented member 132'. In this manner, the center portion of the diaphragm 130' having the segmented insert 29' can be flexed when the flush valve 10' moves from the is open position to the closed position and vice versa. Preferably, the inner edges 140' define an annulus that has a diameter greater than the passageway diameter 32 and the outer edges 142' define an outer diameter of the segmented insert 29' that is less than the outer diameter of the diaphragm 22, so that the segmented insert may be completely embedded within the flexible body 27 of the diaphragm 22. As can be seen, an inner ring 150' is formed and has two connectors 152' attaching the inner ring to two respective segmented members. But for connectors 152', a space 145' is defined between the inner edges 140' and the inner ring 150'. The inner ring 150' adds stability to the diaphragm 22. Likewise, an inner diameter 154 is greater than the diameter of the passageway 32. The insert 29' can either be completely embedded within the body 27 or partially embedded within the body 27 so that side 137 may be exposed. Preferably inserts 29 and 29' are molded as in integral piece.

The prior art diaphragms as discussed above, in general have rubber surrounding and molded to a plurality of copper stiffeners. The present invention utilizes only one insert to facilitate injection molding. Further, the segmented insert 29 provides stiffening in the radial direction while it permits flexibility of the diaphragm in the circumferential direction C (see FIG. 4). The diaphragm of the present invention is preferably used above the valve seat in the free position and resists downward motion to allow a soft/slow and noise resistant shut-off. The TPE utilized in the present invention is chloramine resistant as opposed to rubber. The TPE to polypropylene bonding provided by the present invention better resists delamination than rubber molded copper. Further polypropylene segments minimize leaks due to the body 27 cracking from wear.

The present invention has been described with reference to specific details of particular embodiments thereof. It is not intended that such details be regarded as limitations upon the scope of the invention except insofar as and to the extent that they are included in the accompanying claim.

The invention claimed is:

1. A flush valve diaphragm comprising:
a body having a flexible body portion and a segmented insert within the flexible body portion, the body comprising:
a central passageway;
a peripheral sealing portion comprising a sealing ring extending along the periphery of the body, the sealing portion with a thickness greater than the thickness of portion of the body within the sealing ring, wherein the flexible body portion is within the peripheral sealing portion;
a first integral ring on a first side of the body radially spaced from the sealing ring;
a second integral ring on opposite second side of the body radially spaced from the sealing ring;
an integral filter integrally formed in the body located between the sealing ring and the first integral ring and between the sealing ring and the second integral ring;
a bypass chamber positioned between the first integral ring and the sealing ring; an exit chamber positioned between the second integral ring and the sealing ring; a bypass orifice extending from and allowing fluid communication between the bypass chamber and the exit chamber; and
the segmented insert comprising a plurality of trapezoidal members with protrusions extending outward from a major surface of the trapezoidal members, wherein the plurality of trapezoidal members are connected to each other on their outermost edge by a runner.

2. The flush valve diaphragm according to claim 1, wherein the runner of the segmented insert is an endless runner and each of the trapezoidal members comprises a first side and an opposite second side, the second side having a length less than the first side, the first side of each of the trapezoidal members connected to the endless runner and the second side of each of the members in facing relationship to the central passageway of the body.

3. The flush valve diaphragm according to claim 1, wherein the segmented insert is made of plastic and each of the trapezoidal members comprises a first major surface and an opposite second major surface, wherein the protrusions extend from the first major surface and the second major surface is flat.

4. The flush valve diaphragm according to claim 1, wherein the flexible body portion is made of a thermoplastic elastomer.

5. The flush valve diaphragm according to claim 4, wherein the flexible body portion is made of a chloramine resistant thermoplastic elastomer.

6. The flush valve diaphragm according to claim 5, wherein the flexible body portion is made of santaprene.

7. The flush valve diaphragm according to claim 4, wherein the segmented insert is made of polypropylene.

8. The flush valve diaphragm according to claim 4, wherein the segmented insert is made of polypropylene and the flexible body portion is made of santaprene.

9. The flush valve diaphragm according to claim 8, wherein the runner of the segmented insert is an endless runner and each of the trapezoidal members comprises a first side and an opposite second side, the second side having a length less than the first side, the first side of each of the trapezoidal members connected to the endless runner and the second side of each of the members in facing relationship to the central passageway of the body.

10. The flush valve diaphragm according to claim 9, wherein each of the trapezoidal members comprises a first major surface and an opposite second major surface, wherein the protrusions extend from the first major surface and the second major surface is flat.

11. The flush valve diaphragm according to claim 1, wherein the segmented insert further comprises an inner ring attached to at least one of the trapezoidal members.

12. In a flush valve diaphragm of the type having a flexible rubber body and a metal insert embedded in the flexible rubber body, the flush valve diaphragm used with water closets and urinals, which utilize the flexible diaphragm to establish, and to seal off, the connection between inlet and outlet sides of a flush valve, the improvement comprising;
the flush valve diaphragm comprises a plastic segmented insert embedded in a body made of a thermoplastic elastomer, the plastic segmented insert comprising a plurality of trapezoidal members with protrusions extending outward from a major surface of the trapezoidal members, wherein the plurality of trapezoidal members are connected to each other on their outermost edge by a runner.

13. The flush valve diaphragm according to claim 12, wherein the runner is an endless runner and each of the trapezoidal members comprises a first side and an opposite second side, the second side having a length less than the first side, the first side of each of the trapezoidal members connected to the endless runner.

14. The flush valve diaphragm according to claim 13, wherein the body is made of a chloramine resistant thermoplastic elastomer.

15. The flush valve diaphragm according to claim 14, wherein the body is made of santaprene.

16. The flush valve diaphragm according to claim 12, wherein the segmented insert is made of polypropylene.

17. The flush valve diaphragm according to claim 12, wherein the segmented member is made of polypropylene and the flexible body is made of santaprene.

18. A flush valve diaphragm comprising:
a body having a flexible body portion and a segmented insert within the flexible body portion, the body comprising:
a central passageway;
a peripheral sealing portion extending along the periphery of the body, and
a bypass orifice defined by the body; and
the segmented insert comprising a plurality of members connected to each other and each of the plurality of members comprising a first side edge, an opposite second side edge, an outer edge and an opposite inner edge, wherein the plurality of members are connected to one another at their outer edge such that the first side edge and the second side edge of adjacent ones of the plurality of members are spaced from one another.

19. The flush valve diaphragm as claimed in claim 18, wherein the segmented insert defines a central annular portion having a first diameter which is greater than a diameter of the central passageway.

20. The flush valve diaphragm as claimed in claim 19, wherein the inner edge defines a portion of the annular portion and the outer edge defines an outermost edge of the segmented insert, wherein the outermost edge has a diameter less than an outer diameter of the diaphragm.

21. The flush valve diaphragm as claimed in claim 20, wherein the members are attached to each other by a runner.

22. The flush valve diaphragm as claimed in claim 21, wherein the runner attaches the members at the second side of the member thereby forming an endless runner, and adjacent first sides of the members are spaced apart from each other.

23. The flush valve diaphragm as claimed in claim 18, wherein the members are the same shape.

24. The flush valve diaphragm as claimed in claim 23, wherein the members are a geometric shape.

25. The flush valve diaphragm as claimed in claim 18 comprising:
wherein the plurality of members each have the same quadrilateral shape.

26. The flush valve diaphragm as claimed in claim 25, wherein the quadrilateral is a trapezoid.

27. The flush valve diaphragm as claimed in claim 18, wherein the plurality of members include a major surface having protrusions extending therefrom, wherein the protrusions have a height less than the thickness of the diaphragm body adjacent to the protrusions.

28. The flush valve diaphragm as claimed in claim 18, wherein the flexible body portion is made of a different material than the material used in the segmented insert.

29. The flush valve diaphragm as claimed in claim 28, wherein the segmented insert is completely embedded within the flexible body portion.

30. The flush valve diaphragm according to claim 18, wherein the segmented insert comprises an inner ring attached to at least one of the members.

31. A flush valve, comprising:
a valve body defining an inlet opening and an outlet opening;
a valve seat positioned between the inlet and the outlet of the flush valve;
a flush valve diaphragm assembly movable to a closing position on the valve seat to stop flow between the inlet and the outlet; and
a diaphragm assembly positioned in the valve body and separating the inlet and the outlet, with the diaphragm assembly configured to have a pressure difference applied across the diaphragm assembly and said diaphragm assembly comprising:
a body having a flexible body portion and a segmented insert within the flexible body portion, the body comprising:
a central passageway;
a peripheral sealing portion extending along the periphery of the body, and
a bypass orifice defined by the body; and
the segmented insert comprising a plurality of members connected to each other and each of the plurality of members comprising a first side edge, an opposite second side edge, an outer edge and an opposite inner edge, wherein the plurality of members are connected to one another at their outer edge such that the first side edge and the second side edge of adjacent ones of the plurality of members are spaced from one another and the inner edge of each of the plurality of members forms an opening having a diameter that is greater than a diameter of the central passageway.

32. The flush valve diaphragm according to claim 31, wherein the segmented insert comprises an inner ring attached to at least one of the members.

* * * * *